United States Patent
Dunn et al.

[11] Patent Number: 6,120,658
[45] Date of Patent: Sep. 19, 2000

[54] ELECTRODE COVER FOR PREVENTING THE GENERATION OF ELECTROLYTE MIST

[75] Inventors: Grenvil M. Dunn; Henry E. Holliday, both of Gauteng, South Africa

[73] Assignee: Hatch Africa (PTY) Limited, Gauteng, South Africa

[21] Appl. No.: 09/298,805

[22] Filed: Apr. 23, 1999

[51] Int. Cl.[7] .................................................. C25B 13/02
[52] U.S. Cl. .......................... 204/279; 204/281; 204/282
[58] Field of Search .................................. 204/279, 281, 204/282

[56] References Cited

U.S. PATENT DOCUMENTS

| | | | |
|---|---|---|---|
| 587,696 | 8/1897 | Boucher . | |
| 813,844 | 2/1906 | Van Scoyoc . | |
| 1,032,623 | 7/1912 | Reed . | |
| 1,176,105 | 3/1916 | Swartley, Jr. . | |
| 1,255,096 | 1/1918 | Jaubert . | |
| 2,321,367 | 6/1943 | Diggin | 204/279 |
| 4,075,069 | 2/1978 | Shinohara et al. | 204/106 |
| 4,328,076 | 5/1982 | Fisher et al. | 204/279 |
| 4,406,767 | 9/1983 | Fischer | 204/247 |
| 4,584,082 | 4/1986 | Smith | 204/278 |
| 4,668,353 | 5/1987 | Smith et al. | 204/129 |
| 5,290,413 | 3/1994 | Bauer et al. | 204/243 R |
| 5,312,533 | 5/1994 | Mayr et al. | 204/282 |
| 5,340,456 | 8/1994 | Mehler | 204/242 |
| 5,464,519 | 11/1995 | Tomba et al. | 204/279 |
| 5,470,445 | 11/1995 | Murray et al. | 204/105 R |
| 5,609,738 | 3/1997 | Murray et al. | 204/279 |
| 5,744,018 | 4/1998 | Santoyo et al. | 205/94 |
| 5,783,053 | 7/1998 | Tomba et al. | 204/279 |
| 5,837,111 | 11/1998 | Ebert | 204/279 |

*Primary Examiner*—Bruce F. Bell
*Attorney, Agent, or Firm*—Kirkpatrick & Lockhart LLP

[57] ABSTRACT

A mist preventing cover for an electrode has an upper end which surrounds and is sealed to an electrode above the surface of the electrolyte in an electrowinning cell to thereby form a substantially closed chamber above the electrolyte surface. The lower end of the cover extends below the electrolyte surface and prevents escape of bubbles generated at the surfaces of the electrode, while permitting the passage of electrolyte to the electrode. The bubbles rise to the surface of the electrolyte, where they burst and generate a mist in the closed chamber formed by the electrode cover. The mist contains droplets having substantially the same composition as the electrolyte, as well as gaseous components including water vapor, gas generated by the electrode, and entrapped ambient air. The cover is formed of hydrophilic fibers which absorb the droplets in the mist and drains them back to the electrolyte, while permitting the escape of gases, thereby preventing the generation of electrolyte mist in the surrounding atmosphere.

24 Claims, 4 Drawing Sheets

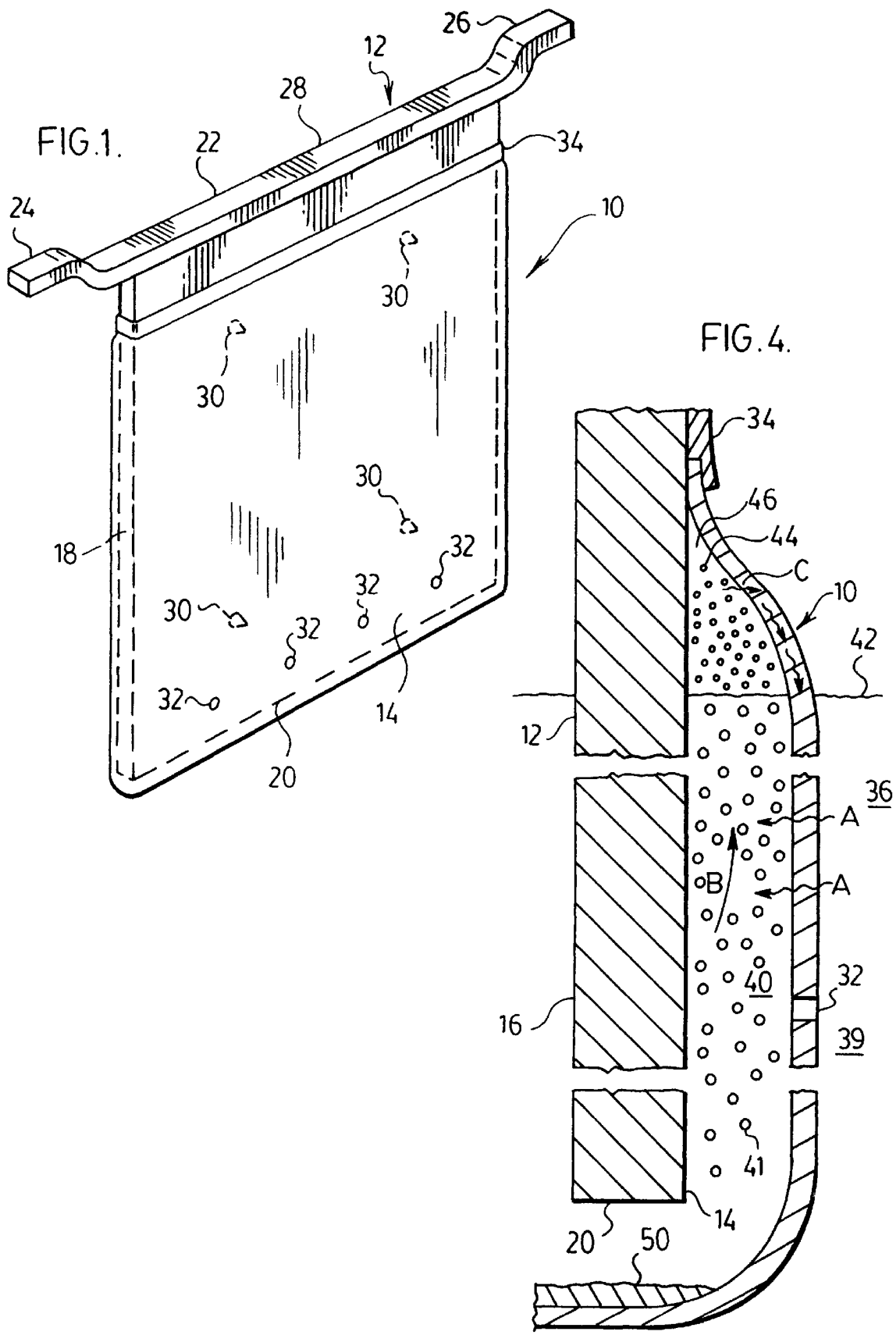

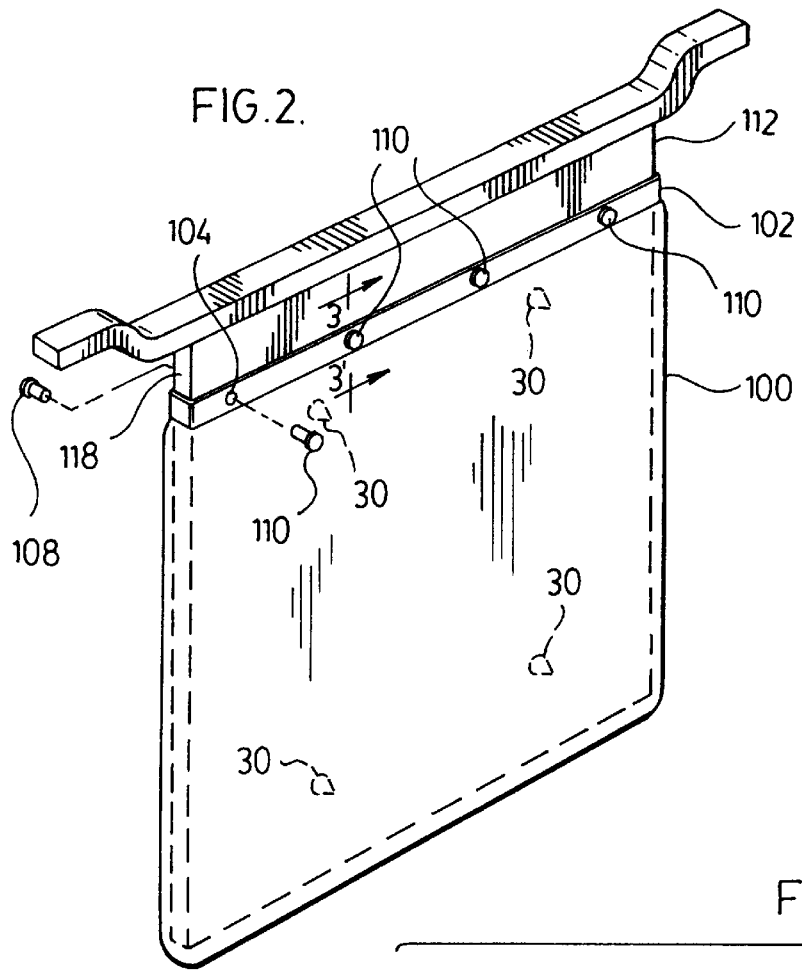
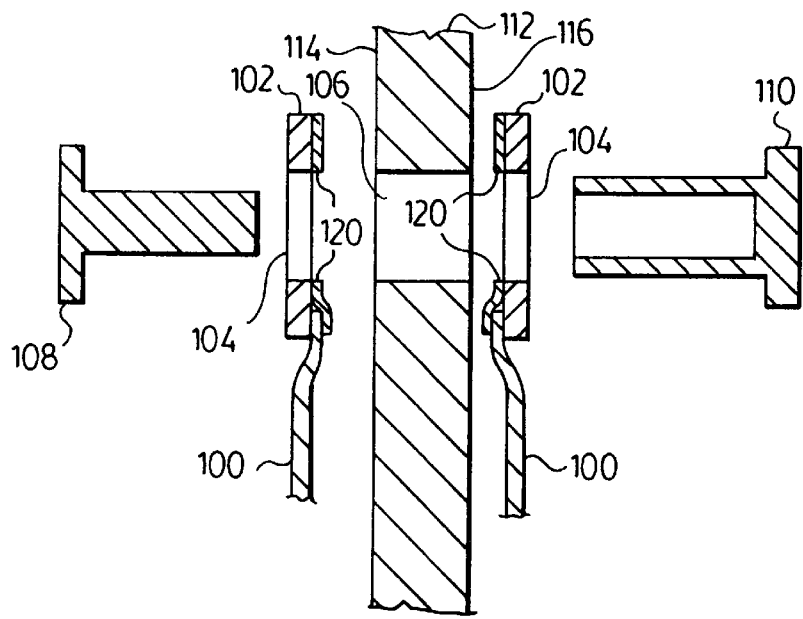

ELECTRODE COVER FOR PREVENTING THE GENERATION OF ELECTROLYTE MIST

FIELD OF THE INVENTION

This invention relates to a cover for an electrode in an electrowinning metal recovery apparatus, and particularly to such a cover which makes it possible to inhibit a mist of electrolyte caused by generation of gases at the electrode.

BACKGROUND OF THE INVENTION

Electrowinning may generally be described as an electrolytic process for recovery of a metal using an aqueous solution of an acid and a metal salt as an electrolyte and an insoluble electrode as an anode to deposit a highly pure metal on a cathode. This method is used to produce a variety of highly pure metals, such as nickel, cobalt, copper, zinc, etc. Typically, electrowinning is carried out in large, open-topped tanks provided with a plurality of flat electrode plates suspended into the electrolyte solution from the top of the tank. A number of such tanks are usually housed in a building known as a tank house.

During the electrolysis reaction, oxygen is liberated at the anode. The oxygen is produced in the form of tiny bubbles which rise to the surface of the electrolyte and burst. These bubbles, comprising a thin layer of electrolyte, emit a mist of near electrolyte composition to the atmosphere surrounding the electrolytic cell when they burst. The composition of the mist is dependent on the composition of the electrolyte, and typically contains sulfuric acid and metal salts.

In view of the fact that electrowinning is typically carried out in enclosed tank houses, the generation of electrolyte mist causes serious concerns in relation to worker safety as well as corrosion of equipment. Various methods have been employed to either contain or inhibit the generation of mist by electrolytic cells. However, none of these methods has proved to be satisfactory.

One common method to deal with electrolyte mist is to provide a powerful ventilation unit to remove contaminated air from the tank house, along with scrubbers to remove contaminants from the air before it is either recirculated or released into the environment. This method has proved to be wasteful of energy and not very effective.

Attenuation of mist production has been attempted by providing layers of floating plastic balls, beads, rods, discs, etc. in the electrolyte in an attempt to provide a surface on which the mist from the bursting gas bubbles may be collected and drain back into the electrolyte bath. Another attempted solution has been to add a surfactant to the electrolyte bath, thereby reducing its surface tension and reducing the intensity of mist breakout. However, neither of these methods has proved to be satisfactory.

Another attempted solution to mist generation is disclosed by U.S. Pat. No. 4,075,069 to Shinohara et al. This patent provides an inert woven fabric screen over an electrode plate from a position above the level of the electrolyte to the bottom of the electrode. The size of the openings in the screen are chosen so that bubbles of gas will not substantially pass through the screen, but rather will coalesce into larger bubbles as they pass upwardly along the surface of the electrode. When these larger bubbles burst at the surface of the electrolyte, they apparently generate less electrolyte mist than if the bubbles were not coalesced. Bubble coalescence has also been used by others to reduce the generation of electrolyte mist, for example see U.S. Pat. Nos. 4,584,082 and 4,668,353. However, bubble coalescence permits some mist to escape into the atmosphere, and is therefore of limited use. In addition, the size of the openings in the mesh in Shinohara et al. are believed to be sufficiently large as to allow some of the gas to be swept away from the face of the anode by modem cell flow systems, which would further reduce its capacity to reduce mist.

SUMMARY OF THE INVENTION

The present invention overcomes the above-noted and other disadvantages of known systems for removing or preventing the generation of electrolyte mist by providing an electrode cover which substantially completely encloses the portion of the electrode extending above the surface of the electrolyte. The cover is comprised of a woven material which is impermeable to solids, but which is permeable to gases and the electrolyte solution, thereby substantially completely preventing the generation of mist in the atmosphere surrounding the electrowinning apparatus.

The electrode cover of the invention comprises an envelope member which, when installed on an electrode, has an upper end which extends above the surface of the electrolyte and is sealed to the electrode, and a lower end which extends below the surface of the electrolyte. Gas bubbles formed at the electrode rise upwardly to the surface of the electrolyte and burst, thereby forming a mist of finely dispersed electrolyte droplets. The electrode cover of the invention substantially completely encloses the area of the electrolyte surface in which the gas bubbles burst, thereby forming a substantially closed chamber in which the mist is generated and trapped.

At least the portion of the electrode cover extending above the surface of the electrolyte comprises a membrane of tightly woven hydrophilic fibers. The droplets of electrolyte in the mist are absorbed by the hydrophilic membrane, and the absorbed electrolyte is eventually drained by gravity back into the electrolyte solution in the tank.

Although the electrolyte mist generated by bursting gas bubbles does not pass through the electrode cover, the membrane of tightly woven hydrophilic fibers is permeable to gases, including air, water vapour and the gas generated at the electrode, thereby preventing build-up of pressure within the cover. Furthermore, the membrane is impermeable to solids, and therefore prevents escape into solution of solid electrode decomposition products.

Therefore, the electrode cover of the present invention effectively filters the mist generated by bursting gas bubbles by trapping the fine droplets of electrolyte while permitting the gaseous components of the mist to pass through the cover into the atmosphere. The inventors have found that the electrode cover according to the invention is capable of exceeding industry and government standards for mist reduction, and reduces the generation of mist to levels substantially below those achieved by prior art devices. In fact, experiments conducted with a preferred electrode cover according to the present invention have shown that electrolyte mist can be substantially completely eliminated by following the teachings of the present invention.

Accordingly, in one aspect, the present invention provides an electrode cover for preventing the generation of a mist above a surface of an aqueous electrolyte during electrowinning metal recovery, said mist being caused by production of a gas at an electrode, a lower portion of which is immersed below said surface of said electrolyte during said electrowinning and an upper portion of which extends above said surface of said electrolyte during said electrowinning, said cover comprising: an envelope member having an open upper end and a lower end, said envelope member comprising a membrane of tightly woven hydrophilic fibers, said membrane being substantially impermeable to solid electrolyte decomposition products and permeable to liquid electrolyte, air, water vapour and to said gas generated at the electrode; sealing means provided on said tubular member at said open upper end, said sealing means adapted to form a seal between said open upper end of said envelope member and said upper portion of said electrode to thereby form a substantially closed chamber about said upper portion of said electrode, said chamber being defined by said surface of said electrolyte and said cover.

BRIEF DESCRIPTION OF THE DRAWINGS

The invention will now be more fully described, by way of example only, with reference to the accompanying drawings, in which:

FIG. 1 is a perspective view of an electrode cover according to a first preferred embodiment of the present invention substantially completely enclosing an electrode of an electrowinning apparatus;

FIG. 2 is a perspective view of an electrode cover according to a second preferred embodiment of the invention substantially completely enclosing an electrode of an electrowinning apparatus;

FIG. 3 is a cross-sectional view along the line 3–3' of FIG. 2;

FIG. 4 is a schematic, enlarged cross-sectional side view of the electrode cover and electrode of FIG. 1 immersed in electrolyte during an electrowinning operation;

DETAILED DESCRIPTION OF PREFERRED EMBODIMENTS

Figure 5:
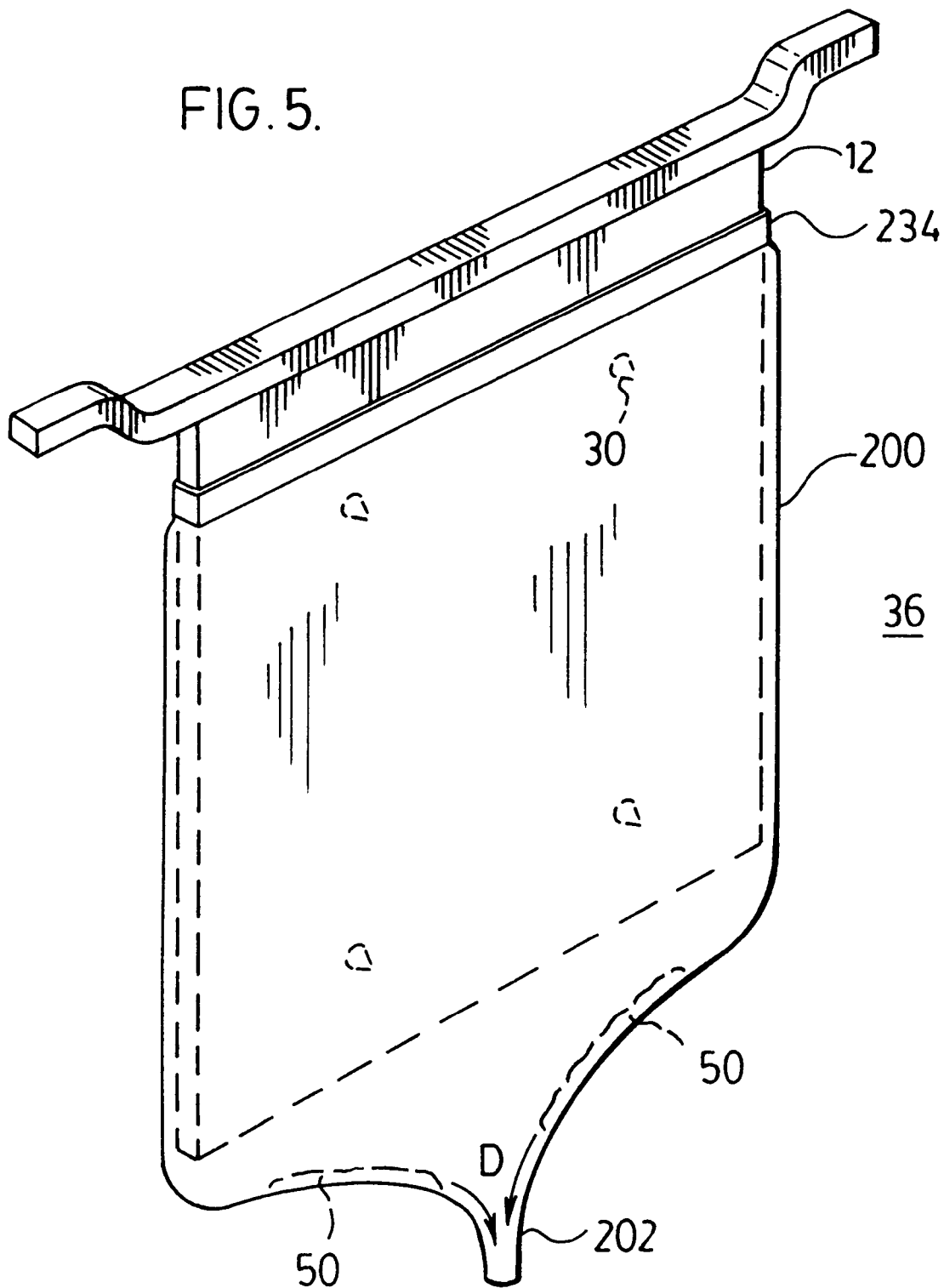
FIG. 5 is a perspective view of an electrode cover according to a third preferred embodiment of the present invention installed on the electrode of FIG. 1, the electrode cover having a drain neck for sludge removal.
Figure 6:
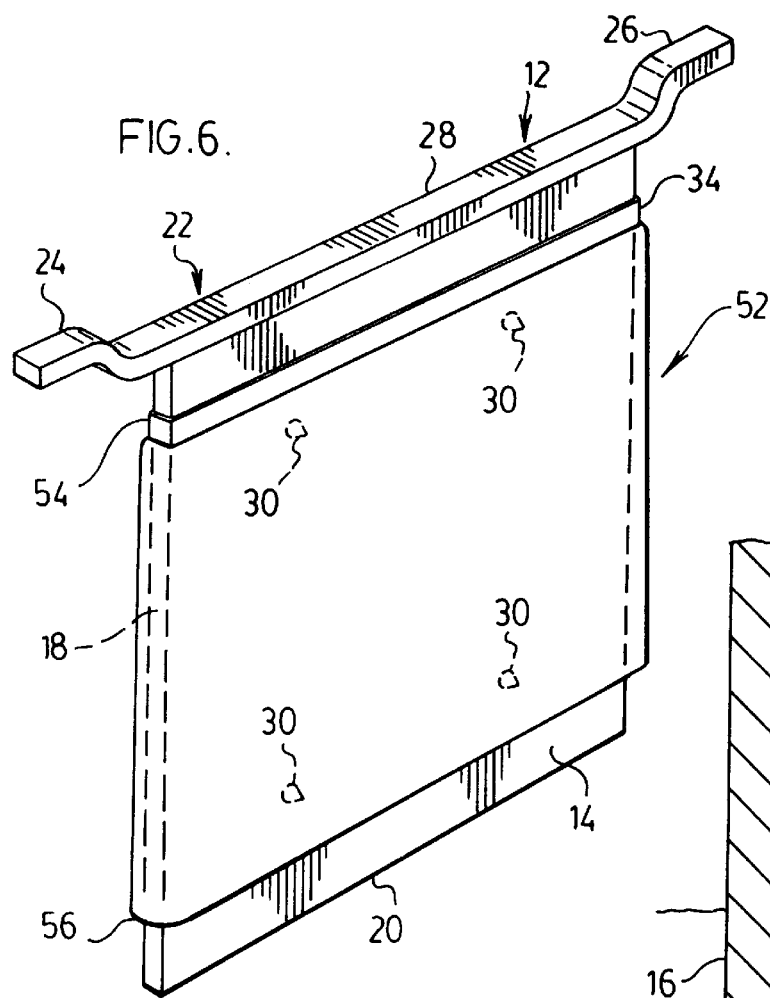
FIG. 6 is a perspective view of an electrode cover according to a fourth preferred embodiment of the present invention installed on the electrode of FIG. 1, the electrode cover being in the form of a skirt which surrounds only an upper portion of the electrode.
Figure 7:
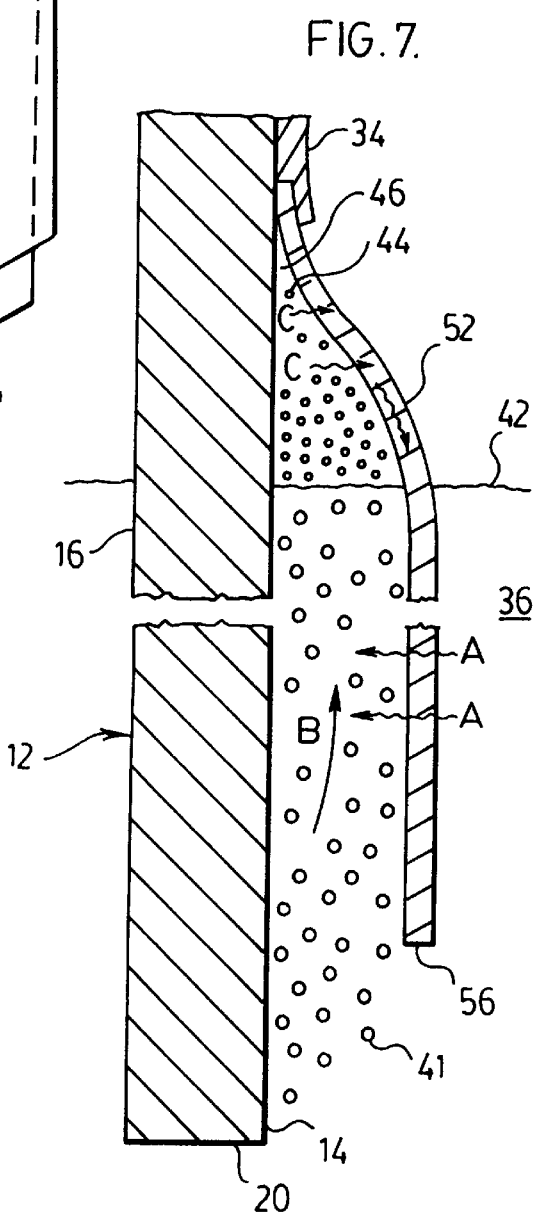
FIG. 7 is a schematic, enlarged cross-sectional side view of an electrode cover and the electrode of FIG. 6 immersed in electrolyte during an electrowinning operation.

Preferred embodiments of the present invention are now described with reference to the drawings.

FIG. 1 illustrates a first preferred embodiment of an electrode cover 10 according to the present invention installed on an electrode 12 of an electrowinning apparatus. Electrode 12 comprises a flat, rectangular plate of metal having a front face 14, a rear face 16, with side edges 18 and a bottom edge 20 joining the front and rear faces 14 and 16. The electrode 12 is adapted to be suspended in an electrolyte bath in the tank of a conventional electrowinning apparatus (not shown). The electrode 12 is provided along its top with a support bar 22 extending along the top of electrode 12 and outwardly of the side edges 18. The support bar 22 is made of metal and is adapted to be supported at its ends on the rim of the electrowinning tank. The end portions 24 and 26 of support bar 22 are preferably raised relative to its central portion 28 in order to immerse as great a portion as possible of the electrode plate 12 in the electrolyte bath.

Preferably, the electrode comprises an anode and is made of lead or an appropriate alloy of lead incorporating antimony, calcium, tin, silver, etc. Electrical current is delivered to the anode through the support bar 22. The anode is suspended in the electrolyte bath between two similarly shaped cathodes, upon which a pure metal is deposited. In a typical anode used in an electrowinning apparatus, the front and rear faces 14 and 16 have a width of about 0.85 to 1.0 m, with the distance between the ends of the support bar 22 and the bottom edge 20 of electrode 12 being about 1.2 m. The length of the support bar is typically about 1.3 to 1.5 m, with the first end 24 of support bar 22 having a length of about 0.17 m, and the second end 26 of support bar 22 having a length of about 0.31 m. The thickness of the ends 24 and 26 of support bar 22 is about 40 mm, and the thickness of the electrode 12 from the front face to the rear face is typically about 6 to 10 mm.

The electrode cover is attached to the front face 14, rear face 16 and side edges 18 of the electrode at a distance of about 5 to 15 mm below the support bar 22. The electrode cover 10 according to the first preferred embodiment is in the form of a bag which completely surrounds the electrode 12 and is sized to closely receive electrode 12. For example, it is preferred that the anode bag be fixed to the front and rear faces 14 and 16 by a plurality of anode spacer cones 30 having a height of about 5 to 25 mm, provided in spaced relation on the front and rear faces 14 and 16 of electrode 12. In the preferred embodiment shown in FIG. 1, the front and rear faces 14 and 16 are each provided with four spacer cones 30. Other similar electrode spacing devices may be employed to restrain the movement of the anode bag and more specifically to prevent damage from the adjacent cathode. Another type of spacing device is known in the art as a "hairpin".

Preferably, the electrode cover 10 fits tightly against the side edges 18 and bottom edge 20 of electrode 12.

The electrodes are periodically removed from the electrowinning apparatus for various reasons, such as cleaning, recharging the electrolyte, or replacement of the electrodes. In order to assist in draining electrolyte from the bag during lifting, drainage holes 32 can be provided in the electrode cover 10 close to its lower end. In the first preferred embodiment shown in FIG. 1, four drainage holes 32 are provided in the lower portions of the cover 10 at the front and rear faces 14 and 16 of electrode 12. The holes 32 preferably have a diameter of about 5 mm and are spaced a sufficient distance from the lower end of cover 10 so as not to allow escape of any solid electrode decomposition wastes generated during the electrowinning process. However, it is to be appreciated that the electrolyte will drain through the fabric comprising cover 10, and therefore drainage holes 32 are not necessarily provided in electrode covers according to the invention which completely enclose the electrode as shown in FIG. 1.

The electrode cover 10 is sealed to the front and rear faces 14 and 16 and the side edges 18 in a liquid and gas-tight seal. This seal is formed above the level of the electrolyte, and is provided by an adhesive band 34 having a width of about 15 to 40 mm formed at the upper peripheral edge of the electrode cover 10. The adhesive is preferably one which is suitable for forming a fabric to metal bond, more preferably a fabric to lead bond. Furthermore, the adhesive seal may preferably be broken and re-applied without damage to the electrode or to the fabric comprising the electrode cover 10. Preferred adhesives include polychloroprene.

FIGS. 2 and 3 illustrates an electrode cover 100 according to a second preferred embodiment of the invention installed on an electrode 112. Electrode cover 100 and electrode 112 are preferably identical to cover 10 and electrode 12 described above with reference to FIG. 1, with the exception that the electrode cover 100 is sealed to the electrode 112 by mechanical fastening means extending through holes in the electrode 112. Specifically, the upper peripheral edge of the electrode cover 100 is secured to a continuous backing flange 102 which may preferably be comprised of a flexible plastic material such as polyethylene or polypropylene. Backing flange 102 preferably has a width of from about 15 to about 40 mm and has a plurality of apertures 104 formed therethrough. As illustrated in FIG. 3, the apertures 104 are arranged in spaced relation on flange 102 so as to register with a plurality of holes 106 formed through electrode 112. The flange 102 is secured to the electrode 112 by a plurality of two piece fasteners each comprising a male portion 108 and a female portion 110, such that when the fastener is assembled with 108 inserted into 110, the flange 102 is pressed firmly against the opposing front and rear faces 114 and 116 of electrode 12. The fasteners 108 and 110 may preferably be made of a suitable plastic material such as polypropylene and polyethylene. Preferably, the number and spacing of apertures 104 and holes 106 is such that flange 102 is secured to electrode 112 in a substantially liquid and gas-tight seal. While no mechanical fastening means are provided between flange 102 and side edges 118 of electrode 112, it is preferred that flange 102 is sized and shaped to closely fit against the side edges 118.

Although FIGS. 2 and 3 illustrate flange 102 being secured to electrode 112 by plastic fasteners 108 and 110, it is to be appreciated that flange 102 may be secured to electrode 112 through holes 104 and 106 by any one of a number of alternate attachment means which may be removable or permanent. Other examples preferred fasteners include bolts, rivets and the like. In addition, the mating surfaces of fasteners 108 and 110 may be provided with threads or barbs to prevent the fasteners from loosening during use of the electrode cover 112. Furthermore, it may also be preferred to further strengthen the seal between flange 102 and electrode 112 by providing a layer of adhesive 120 on the surfaces of flange 102 facing the surfaces 114, 116 and 118 of the electrode 112, such adhesive preferably comprising polychloroprene.

After the electrode cover is attached to the electrode in the manner shown in FIG. 1 or FIGS. 2 and 3, the covered electrode is lowered into the electrowinning tank containing an electrolyte solution and a corresponding cathode, and an electric current is applied to the apparatus to begin the electrowinning process. The following discussion will describe an electrowinning operation involving the electrode cover 110 and electrode 12 of FIG. 1, with electrode 12 comprising an anode used in electrowinning of a metal such as nickel, cobalt, copper, zinc, etc. The anode is comprised of lead or a lead alloy and is suspended in the electrolyte solution between two cathodes upon which pure metal is electrodeposited. The electrolyte solution preferably comprises an aqueous solution of sulfuric acid and one or more metal salts, the preferred metal cation of the salt corresponding to the metal being deposited on the cathode.

The electrolyte 36 is circulated throughout the tank of the electrowinning apparatus by forced and induced circulation so that the electrodes in the tank are in constant contact with fresh electrolyte. As shown in schematic FIG. 4, the electrode cover 10 permits electrolyte 36 to freely pass through cover 10 from the area 39 outside cover 10 to the area 40 enclosed by cover 10, i.e. the area between cover 10 and anode 12. The free movement of the electrolyte solution 36 through the fabric comprising cover 10, indicated by arrows A, and more specifically the movement of conducting ions in the electrolyte, is important since resistance to movement results in cell voltage becoming elevated during long periods of operation, thereby reducing the power efficiency.

At the surfaces of anode 12, tiny bubbles 41 of oxygen are generated which rise upwardly and outwardly therefrom, for example in the direction of arrow B. The outward movement of the bubbles 41 is at least partially due to the circulation of the electrolyte 36 in area 40 enclosed by cover 10, which sweeps the bubbles 41 away from the surface of the anode 12. These bubbles burst when they reach the surface 42 of electrolyte 36 in area 40. For simplicity, FIG. 4 shows bubbles 41 being generated only at front face 14 of anode 12. However, it will be appreciated that bubbles 41 are generated at all surfaces 14, 16,18 and 20 of anode 12 which are in contact with the electrolyte 36.

The energy from the bursting bubbles 41 generates tiny droplets 44 having substantially the same composition as the electrolyte in the space 46 above the electrolyte surface 42. This space 46 is completely enclosed by the electrode cover 10 which, as discussed above, is sealed to the anode 12 by adhesive band 34. Droplets 44, in combination with oxygen from the bursting bubbles, form an aerosol mist in space 46. The salt components of the electrolyte such as sulfuric acid and metal salts have very low vapor pressure and are therefore substantially only present in the liquid droplets in the mist.

Eventually, the droplets 44 in the mist come into contact with the electrode cover 10. Since the electrode cover 10 is made up of hydrophilic fibers, the droplets wet the fabric and are absorbed therein as indicated by arrows C. As the fabric becomes saturated, the absorbed electrolyte solution is drained downwardly by gravity and/or capillary action into the electrolyte solution 36 in the tank. Thus, none of the droplets 44, including the salt components of the electrolyte, pass through the cover 10 to the air space 48 outside of cover 10.

On the other hand, the gaseous components of the aerosol mist, namely air, oxygen and water vapor and any trapped air, pass through the fabric comprising cover 10 from space 46 to space 48 outside cover 10, since the cover 10 is permeable to gases. Therefore, cover 10 effectively prevents the escape of electrolyte mist from the interior of the electrode cover 10, while permitting passage of gases therethrough.

Also shown in FIG. 4 is sludge 50 which comprises decomposition products formed by electrolytic corrosion of the anode 12. The anode decomposition products comprising the sludge are solids which have a density greater than that of the electrolyte 36, and therefore settle in the bottom of cover 10. The cover 10 is preferably impermeable to solids, and therefore prevents escape of the sludge 50. In addition, drainage holes 32 are preferably located at a sufficient distance above the area of sludge collection so that the sludge does not escape from the electrode cover 10.

FIG. 5 illustrates an electrode cover 200 according to a third preferred embodiment according to the present invention installed on electrode 12 described above with reference to FIG. 1. Electrode cover 200 is preferably identical to cover 10 described above with the exception that the lower end of cover 200 tapers in a downward direction into a downwardly extending, funnel-shaped drain neck 202. Sludge 50 generated by the electrode settles downwardly into the bottom of cover 200, from where it drains downwardly in the direction of arrows D to enter drain neck 202.

Drain neck 202 is closed during normal operation, for example by being tied shut, and may be opened in order to remove sludge 50 and wash the inner area of the cover when the electrode is periodically removed from the electrowinning tank.

Although electrode cover 200 is shown in FIG. 5 as being secured to electrode 12 by an adhesive band 234 which is preferably identical to adhesive band 34 described above, it is to be appreciated that electrode cover 200 may preferably be secured to an electrode 112 in the manner described above with reference to FIGS. 2 and 3.

In order to provide the properties described above, the fabric is comprised of hydrophilic fibers which are wettable by the aqueous electrolyte. This hydrophilicity is at least partially responsible for the fabric's ability to trap the droplets 44 in the aerosol mist. Preferred fabrics are those comprising polymeric chains having polar substituents or end groups. Particularly preferred fabrics are those comprising polyester fibers in which the fiber forming substance is any long chain polymer comprised of at least 85% by weight of an ester of a dihydric alcohol and a benzenedicarboxylic acid such as terephthalic acid.

In order to provide the permeability characteristics discussed above, the fabric preferably comprise a tortuous membrane having a thickness of from about 1 mm to about 3 mm. The inventors have found that the most preferred fabrics are those in which the gaseous components of the mist move through the fabric in a Brownian velocity regime. Brownian movement is slow gas phase movement through the fabric in such a way that mist particles are attracted to the fabric which is wettable and fall back by drainage into the electrolyte solution.

Most preferred fabrics which have the above properties are polyesters having a heat set finish and variable air permeability in the range of from about 1 to about 100 $l/dm^2/min$ at 20 mm water gauge pressure, with one preferred example having a permeability of about 47 $l/dm^2/min$ at 20 mm water gauge pressure.

Although the fabric comprises a tortuous membrane, and therefore does not have openings which extend from one face of the fabric to the other in the manner of a screen, the fabric used in the electrode covers of the invention could be described as having openings with an effective size of much less than 45 $\mu$m, the minimum size of the openings in the screen used in the above-mentioned Shinohara patent.

Polyesters are preferred due to their acid resistance, hydrophilicity and cost effectiveness. However, the fabric may be comprised of other types of polymers such as polyethylene, polypropylene, polyvinylidene chloride, polyvinyl chloride, which may or may not be treated to adjust their hydrophilicity.

Particularly preferred fabrics are those comprised of twisted yarns which are woven into geometric patterns having various spacing between the yarns. The yarns are preferably of a multifilament type, i.e. composed of several filaments which are continuous strands of fiber of indefinite lengths. The weave of the fabric is preferably 2/1 twill, with the yarn passing over one warp, then over two or more warps in each succeeding row, thereby forming diagonal lines. Preferably, a heat setting finish is applied to the fabric, this treatment typically being applied to stabilize dimensional fabrics containing synthetic fibers.

FIGS. 6 and 7 illustrate an electrode cover 52 according to a fourth preferred embodiment of the present invention which comprises a skirt having an upper end 54 extending above the surface 42 of electrolyte 36 and a lower end 56 extending below surface 42. It is to be noted that schematic FIGS. 4 and 7 are not accurate as to scale and dimension of the electrode and the electrode cover shown therein. Rather, the scale and proportion has been adjusted to more clearly show the principles upon which the present invention operates.

The cover 52 according to the fourth preferred embodiment prevents mist generation in exactly the same manner as the cover 10 according to the first embodiment. However, since forced and induced electrolyte circulation sweep oxygen bubbles 41 away from the surface of the electrode 12, the skirt 52 must be located so that it will capture substantially all of the bubbles 41 given off by the electrode 12. Therefore, the skirt must extend a sufficient distance below surface 42 and outwardly a sufficiently distance from anode 12 so that oxygen bubbles generated below the lower end 56 of skirt 52 will be captured within skirt 52.

As discussed above, the mist generated by bursting oxygen bubbles comprises liquid droplets of electrolyte, water vapor and oxygen given off by the bursting bubbles. In order to avoid build up of pressure inside the air space 46, the fabric of the electrode cover must have sufficient permeability, and must present a sufficient surface area above surface 42, in order to allow sufficient escape of gases so that pressure will not build up inside air space 46. As an example, on passing 250 Amp of current per $m^2$ of electrode face through a copper electrowinning cell at 50° C., oxygen generated at the anode is 0.124 $g/min/m^2$, and is accompanied by approximately 0.093 g/min water vapour. The volume occupied by oxygen and water vapor at 50° C. and 20 mm water gauge pressure is 0.103 $l/mm^2$ and 0.14 $l/mm^2$, respectively. The combined total volume of oxygen and water vapor is 0.24 $l/mm^2$ of anode. The preferred area of exposed fabric above the liquid is such as to allow the passage of this volume of gas per square meter of immersed anode such that the vapor velocity is less than about 10 m/min.

From the preceding discussion, it will be appreciated that the fabric comprising the electrode cover according to the present invention functions differently above the electrolyte surface than below the electrolyte surface. Therefore, it may be preferred in some embodiments of the invention to employ an electrode cover comprising two different types of fabric joined to one another at or below the electrolyte surface. The fabric employed below the electrolyte surface would have a relatively high permeability to permit the free passage of electrolyte solution therethrough, while the portion of the cover extending above the surface 42 would have the properties described above to trap liquid mist droplets while allowing gases to pass therethrough.

Preferred embodiments of the invention are further illustrated by the following examples, demonstrating the mist-reducing capability of electrode covers according to the present invention.

EXAMPLE I

To evaluate the effectiveness of an anode cover comprised of a fabric having permeability 47 $l/dm^2/min$ at 20 mm water gauge pressure, two tests were carried out in which electrolyte mist containing sulfuric acid was generated at the anode and collected into an alkaline solution by means of a plastic hood placed over the anode and a vacuum pump. The extent of neutralization of the alkaline solution was measured by titration. In one experiment, an anode cover was provided over the anode, and in the other experiment, no cover was provided over the anode. The test conditions were as follows:

Current Density: 250 $A/m^2$;

Voltage: 2.1 V;
Time of Electrolysis: 5 hr;
Electrolyte Composition: 172 g/l $H_2SO_4$, 38 g/l Cu;
Electrolyte Temperature: 50° C.;
Anode size (immersed area): 170 mm (width)×160 mm (length)×5 mm (thickness);
Cathode size (immersed area): 160 mm (width)×160 mm (length)×4 mm (thickness); and
Electrode centers: 99.8 mm.

The anode cover used in the tests was comprised of the following fabric:
Composition: 100% polyester
Weight: 240±5% g/m²
Permeability: 47±10% l/dm²/min @20 mm W.G.
Weave: 2/1 twill
Warp Yarn: multi-filament
Weft Yarn: multi-filament
Operating T: 150° C.
Max. Surge T: 180° C.
Finish: Heat Set The anode cover was sealed to the anode in the manner discussed above by an adhesive sold under the trade mark "Super Contact" by Adhesive Technologies.

Where the anode was covered by a cover according to the present invention, no vapor phase acid was detected by the above method. In contrast, where no cover was used, an acidic mist was produced comprising 78 g of $H_2SO_4/m^2$/hr, or 6.9 g/NCM. Therefore, the electrode cover according to the present invention is highly effective at reducing electrolyte mist.

EXAMPLE II

Under test conditions similar to those of Example I, another experiment was conducted to determine the amount of copper released to the atmosphere. From quantitative analysis by ICP the amount of copper was calculated at 1.9 mg/m²/hr (in air extracted from around the anode within the cover of the hood), or 0.17 mg/NCM, with the anode covered by an electrode cover according to the invention, and 1670 mg/m²/hr, or 148.2 mg/NCM, when no cover was used.

EXAMPLE III

Examples I and II were repeated with test conditions as set out above with the exception that the electrolyte composition was 60 g/l Ni and 29 g/l $H_2SO_4$ and the voltage was 3.8 V, in order to determine nickel emissions during electrolysis. With the anode covered by an electrode cover according to the invention, no acid was detected and the amount of nickel was calculated at 1.9 mg/m²/hr (in air extracted from around the anode within the cover of the hood), or 0.17 mg/NCM. When the cover was not used, the amount of $H_2SO_4$ was 460 mg/m²/hr (in air extracted from around the anode within the cover of the hood), or 40.8 mg/NCM, and the amount of nickel was 1350 mg/m²/hr, or 119.8 mg/NCM, when no cover was used.

Examples II and III are to be compared with examples 1, 2 and 3 of the above-mentioned Shinohara patent, in which the amounts of metals in the mist were reduced to levels of 30 to 40 mg/NCM in the free space above the surface of the electrolyte. Current industry standards require concentrations of below 0.1 mg/NCM for nickel, 0.05 mg/NCM for cobalt and 1 mg/NCM maximum in the case of sulfuric acid in the free space above the surface of the electrolyte. Therefore, the Shinohara patent is incapable of meeting current industry standards for mist reduction and reduces mist to a much lesser degree than the electrode covers according to the present invention.

Although the invention has been described in relation to certain preferred embodiments, it is to be understood that the invention is not restricted thereto. Rather, the invention includes all embodiments which may fall within the scope of the following claims.

What is claimed is:

1. An electrode cover for preventing the generation of a mist above a surface of an aqueous electrolyte during electrowinning metal recovery, said mist being caused by production of a gas at an electrode, a lower portion of which is immersed below said surface of said electrolyte during said electrowinning and an upper portion of which extends above said surface of said electrolyte during said electrowinning, said cover comprising:

an envelope member having an open upper end and a lower end, said envelope member comprising a membrane of tightly woven hydrophilic fibers, said membrane being substantially impermeable to solid electrode decomposition products and permeable to the electrolyte, water vapour, air and to said gas generated at the electrode;

sealing means provided on said envelope member at said open upper end, said sealing means adapted to form a seal between said open upper end of said envelope member and said upper portion of said electrode to thereby form a substantially closed chamber about said upper portion of said electrode, said chamber being defined by said surface of said electrolyte and said cover.

2. The electrode cover according to claim 1, wherein said membrane comprises an acid resistant fabric having air permeability of from about 1 to about 100 l/dm²/min at 20 mm water gauge pressure.

3. The electrode cover of claim 2, wherein said membrane has a thickness of from about 1 mm to about 3 mm.

4. The electrode cover of claim 2, wherein said fabric has interstitial openings of a size less than about 45 µm.

5. The electrode cover according to claim 1, wherein the lower end of the electrode cover is adapted to extend below the surface of said electrolyte during said electrowinning.

6. The electrode according to claim 1, wherein said cover is spaced from said lower portion of said electrode.

7. The electrode cover according to claim 1, wherein the lower end of the electrode cover is open, and the lower portion of the electrode extends below the lower end of the cover.

8. The electrode cover according to claim 1, wherein the lower end of the cover is provided with a closed bottom such that the cover surrounds substantially the entire lower portion of the electrode.

9. The electrode cover according to claim 8, wherein the electrode comprises a flat blade having major front and rear opposing surfaces) and said cover is fixed to said front and rear surfaces by a plurality of electrode spacer devices selected from the group consisting of spacer cones and hairpins.

10. The electrode cover according to claim 9, wherein the lower end of the cover is provided with perforations, said perforations being located a sufficient distance above the closed bottom of the cover such that, during said electrowinning, said solid electrode decomposition products are substantially prevented from escaping through said perforations.

11. The electrode cover according to claim 10, wherein said perforations are located about 100 mm from the closed bottom of the cover.

12. The electrode cover according to claim 9, wherein said spacer cones or hairpins have a height of about 5 to 25 mm.

13. The electrode cover according to claim 1, wherein the electrode is an anode.

14. The electrode cover according to claim 13, wherein the anode is comprised of lead or a lead alloy.

15. The electrode cover according to claim 1, wherein the gas is oxygen.

16. The electrode cover according to claim 1, wherein the electrolyte is acidic.

17. The electrode cover according to claim 16, wherein said fabric is woven from a polyester filament having a heat set finish.

18. The electrode cover according to claim 1, wherein said electrode cover is releasably sealed to the upper portion of the electrode by said sealing means.

19. The electrode cover according to claim 18, wherein said sealing means comprises an adhesive band provided on the upper end of the electrode cover.

20. The electrode cover according to claim 19, wherein the adhesive band has a width of from about 15 to about 40 mm.

21. The electrode cover according to claim 20, wherein the adhesive band is comprised of polychloroprene.

22. The electrode cover according to claim 1, wherein the lower end of the cover forms a funnel-shaped drain neck adapted for drainage of said solid electrode decomposition products away from said electrode.

23. The electrode cover according to claim 1, wherein said said electrode comprises a flat blade having major front and rear opposing surfaces and has a plurality of holes extending therethrough from the front surface to the rear surface, said sealing means comprising:

a continuous flange extending along substantially an entire upper peripheral edge of said electrode cover, said flange being provided with a plurality of apertures which are adapted to register with said plurality of holes extending through said electrode, such that said apertures in said flange register with said holes in said electrode at both the front and rear surfaces of the electrode; and fastening means adapted to extend through the registering apertures in the flange and the holes in the electrode and cause said flange to sealingly engage the front and rear surfaces of the electrode.

24. The electrode cover according to claim 23, wherein the flange is further provided with a layer of adhesive by which it is connected to said electrode.

* * * * *